(12) United States Patent
Ong et al.

(10) Patent No.: US 7,846,995 B2
(45) Date of Patent: Dec. 7, 2010

(54) PROCESS FOR REMOVING RUTHENIUM-CONTAINING CATALYST RESIDUES FROM OPTIONALLY HYDROGENATED NITRILE RUBBER

(75) Inventors: Christopher Ong, Leverkusen (DE); Franz-Josef Mersmann, Bergisch Gladbach (DE)

(73) Assignee: LANXESS Deutschland GmbH, Leverkusen (DE)

( * ) Notice: Subject to any disclaimer, the term of this patent is extended or adjusted under 35 U.S.C. 154(b) by 43 days.

(21) Appl. No.: 12/336,626

(22) Filed: Dec. 17, 2008

(65) Prior Publication Data

US 2009/0163640 A1 Jun. 25, 2009

(30) Foreign Application Priority Data

Dec. 21, 2007 (EP) .................................. 07024944

(51) Int. Cl.
*C08F 6/16* (2006.01)
(52) U.S. Cl. ...................................................... 523/310
(58) Field of Classification Search .................. 523/310
See application file for complete search history.

(56) References Cited

U.S. PATENT DOCUMENTS

| 3,716,626 | A | 2/1973 | Kniese et al. ............... 423/418 |
| 4,464,515 | A | 8/1984 | Rempel et al. .............. 525/338 |
| 4,985,540 | A | 1/1991 | Bradford et al. ............. 528/482 |
| 5,118,716 | A | 6/1992 | Arsenault ..................... 521/33 |
| 5,312,940 | A | 5/1994 | Grubbs et al. ................ 556/136 |
| 5,403,566 | A | 4/1995 | Panster et al. ................. 423/22 |
| 6,376,690 | B1 | 4/2002 | Grubbs et al. ................. 556/21 |
| 6,646,059 | B2 | 11/2003 | Nguyen et al. .............. 525/338 |
| 2001/0039360 | A1 | 11/2001 | Grubbs et al. ............... 556/136 |
| 2003/0027958 | A1 | 2/2003 | Guerin et al. ............... 526/171 |
| 2003/0088035 | A1 | 5/2003 | Guerin et al. ............... 525/509 |
| 2004/0132891 | A1 | 7/2004 | Ong et al. .................... 524/492 |
| 2008/0103346 | A1 | 5/2008 | Burdett et al. .............. 585/818 |

FOREIGN PATENT DOCUMENTS

GB 1 558 491 1/1980

OTHER PUBLICATIONS

OrganicLetters2001 vol. 3No. 9pp. 1411-1413_AhnYangAndGeorg_AConvenient Method For The EfficientRemovalOfRutheniumByproductsGeneratedDuringOlefin-MetathesisReactions.
TetrahedronLetters40_1999_pp._4137-4140_PurificationTechniqueForTheRemovalOfRuthenium From Olefin MetathesisReactionProducts.
Organometallicsvol. 85_5888k1976_p. 475.
ChemicalAbstracts87_26590p1977_p. 212.
ChemicalAbstracts95_10502r1981_p. 212.
AngewChemIntEd2004vol. 43_pp. 6161-6165_RomeroPiersAndMcDonald_RapidlyInitiating RutheniumOlefin-MetathesisCatalysts.

*Primary Examiner*—Edward J Cain
(74) *Attorney, Agent, or Firm*—Jennifer R. Seng

(57) ABSTRACT

Novel optionally hydrogenated nitrile rubbers distinguised by a very low ruthenium content are provided as well as a process for the removal of ruthenium-containing catalyst residues from a solution of optionally hydrogenated nitrile rubber by using specific functionalized ion-exchange resins.

23 Claims, No Drawings

PROCESS FOR REMOVING RUTHENIUM-CONTAINING CATALYST RESIDUES FROM OPTIONALLY HYDROGENATED NITRILE RUBBER

FIELD OF THE INVENTION

This invention provides a process for the removal of ruthenium-containing catalyst residues from optionally hydrogenated nitrile rubber and optionally hydrogenated nitrile rubber possessing a very low ruthenium content.

BACKGROUND OF THE INVENTION

Polymer metathesis is a well documented operation, as disclosed, for example, in US 2003/0027958 A1, US 2003/0088035 A1 and US 2004/0132891 A1.

More specifically, certain ruthenium-containing catalysts are known to be particularly suitable for the selective metathesis of nitrile rubber, i.e. the cleavage of the carbon-carbon double bonds without concomitant reduction of the carbon-nitrogen triple bonds present in the nitrile rubber.

For example, US 2003/0088035 A1 teaches the use of bis(tricyclohexylphosphine)benzylidene ruthenium dichloride in such a process resulting in a nitrile rubber with a reduced molecular weight. Similarly, US 2004/0132891 A1 teaches the use of 1,2-bis-((2,4,6-trimethylphenyl)-2-imidazolidinylidene)(tricyclohexylphosphine)-ruthenium(phenylmethylene)dichloride for the metathesis of nitrile rubber, although in the absence of a co-olefin. In both of these processes the nitrile rubber is first dissolved in a suitable solvent to provide a viscous rubber solution. If desired a co-olefin is added to the reaction solution. The catalyst is then dissolved in the rubber solution. Following the metathesis of the nitrile rubber the rubber solution can be optionally hydrogenated to hydrogenated nitrile rubber ("HNBR") 30 using known hydrogenation techniques, as disclosed, for example, in U.S. Pat. No. 4,464,515, and GB-A-1,558,491.

While the polymer metathesis itself is a well documented process, this does not apply to the post-metathesis separation of the metathesis catalyst from the polymer.

Even with regard to hydrogenation of unsaturated nitrite rubbers only a limited number of publications are dealing with or even mentioning the separation of the hydrogenation catalyst from the reaction mixture and/or the hydrogenated nitrile rubber.

U.S. Pat. No. 4,464,515 teaches the use of hydrido rhodium tetrakis (triphenylphosphine) catalyst, i.e. HRh(PPh$_3$)$_4$, in a process to selectively hydrogenate unsaturated nitrile rubber. The unsaturated nitrile rubber is first dissolved in a suitable solvent to provide a viscous rubber solution, The catalyst is then dissolved in the rubber solution. The hydrogenation process is said to be homogeneous because the substrate and catalyst are contained in the same phase. The HNBR obtained is precipitated and simply washed with iso-propanol. There is no further disclosure about removing the hydrogenation catalyst.

GB-A-1,558,491 teaches the use of chloro rhodium tris (triphenylphosphine) (RhCl(PPh$_3$)$_3$) as catalyst in a process to hydrogenate unsaturated nitrile rubber. The hydrogenation product is separated off from the reaction solution by treatment with steam or by pouring into methanol and is subsequently dried at elevated temperature and reduced pressure. Once more no teaching is given how the hydrogenation catalyst might be removed.

U.S. Pat. No. 6,376,690 discloses a process for removing metal complexes from a reaction mixture and it is said that such process is especially amenable for the post-reaction separation of ruthenium and osmium metathesis catalysts from the desired products. Said separation process in which a second immiscible solution containing a solubility-enhancing compound (preferably a phosphine or derivative thereof) is added to the original reaction mixture. The metal catalyst once reacted with the solubility-enhancing compound migrates out of the reaction mixture into the second solution. This solution is then removed from the reaction solution.

While U.S. Pat. No. 6,376,690 teaches for the removal of metals like Cu, Mg, Ru, and Os, it involves the addition of additives which, if not fully removed, can interfere in any subsequent reaction step, like e.g. with the hydrogenation catalyst used in a subsequent hydrogenation reaction. Secondly, the separation of two immiscible solutions while relatively easy on small scale is quite a complex process on a commercial scale of grand scale.

WO-A-2006/047105 discloses the separation of a metathesis catalyst from a reaction mixture through contact of the reaction mixture with a nanofiltration membrane. The reaction mixture contains not only the metathesis catalyst, but in addition one or more unconverted reactant olefins, optionally a solvent and one or more olefin products. As nanofiltration membranes a polyimide membrane is preferably used so as to recover a permeate containing a substantial portion of the olefin reaction products, the unconverted reactant olefins, and optional solvent, and a retentate containing the metathesis catalyst, and optionally, metathesis catalyst degradation products. The process of WO-A-2006/047105 is considered to be applicable to homogeneous metathesis catalysts on the basis of ruthenium, molybdenum, tungsten, rhenium, or a mixture thereof, preferably on the basis of ruthenium. WO-A-2006/047105 does not comment on the possibility of utilizing such a membrane technology for the removal of a rhodium species also. Therefore in the situation were said nitrile rubber is hydrogenated in the next step two separate metal catalyst recovery processes would probably be needed resulting in considerable cost increases and negative capacity results.

Organic Letters, 2001, Vol. 3, No. 9, pages 1411-1413 describes a method for removing undesired highly colored ruthenium byproducts generated during olefin metathesis reactions with Grubbs catalysts. The crude reaction products like diethyl diallylmalonate obtained by ring closing metathesis are treated with triphenylphosphine oxide or dimethyl sulfoxide, followed by filtration through silica gel. This allows to remove the colored ruthenium-based byproducts which is important as an incomplete removal is known to cause complications such as double bond isomerization during distillation or decomposition of the reaction products. However, as with U.S. Pat. No. 6,376,690, the use and introduction of additives such as dimethyl sulfoxide could—if not completely removed after its use—be detrimental if applied to solutions of nitrile rubber which shall then be subjected to a subsequent hydrogenation. A transfer of such process to nitrile rubber solutions is therefore not a viable alternative. Additionally the necessary silica gel filtration process in terms of a commercial process would result in extensive costs.

In Tetrahedron Letters 40 (1999), 4137-4140 it is disclosed to add a water-soluble tris(hydroxymethyl)phosphine to a reaction mixture which contains diethyldiallylmalonate obtained by ring closing metathesis in the presence of the Ru-catalyst Grubbs I. It is observed that when the crude reaction mixture is added to a solution of tris(hydroxymethyl) phosphine and triethylamine in methylene chloride, the solution turned from a black/brown color to pale yellow within five minutes, this indicating that tris(hydroxymethyl)phosphine was coordinating to the ruthenium. Upon the addition of water, the yellow color moved into the aqueous phase leaving the methylene chloride phase colorless. NMR studies showed that all of the desired product remained in the methylene chloride phase and all of the phosphine moved to the aqueous phase. In an alternative embodiment the diethyldiallylmalonate solution containing the ruthenium catalyst byproducts was stirred with a solution of tris(hydroxymethyl) phosphine, and triethylamine in methylenechloride in the simultaneous presence of excess silica gel. As the tris(hydroxymethyl)phosphine is know to graft onto silica gel this gave the best results.

The recovery of rhodium complexes from non-viscous chemical process streams using ion-exchange resins is also known. For example, DE-OS-1 954 315 describes the separation of rhodium carbonyl catalysts from (low molecular weight) oxo reaction mixtures by treating the raw oxo reaction mixtures with a basic ion exchanger in the presence of CO and hydrogen.

Chemical Abstracts 85: 5888k (1976) teaches the use of a thiol-functionalized resin to recover Group VIII noble metal complexes which have been used as catalysts in hydrogenation, hydroformylation and hydrocarboxylation. Organic solutions containing said catalyst residues are treated with ion-exchange resins.

Chemical Abstracts 87: 26590p (1977) describes a two-stage process in which (i) an aqueous, noble-metal containing solution is prepared by extracting the noble metal from a waste ceramic catalyst carrier and (ii) the noble metal is then adsorbed on an ion-exchange resin.

Eventually, Chemical Abstracts 95: 10502r (1981) relates to the simultaneous recovery of platinum and rhodium by extracting the metals from spent catalysts using HCl and $HNO_3$, followed by the subsequent use of an ion-exchange column to adsorb the metals.

U.S. Pat. No. 4,985,540 discloses a process for removing rhodium-containing catalyst residues from hydrogenated nitrile rubber by contacting a functionalized ion exchange resin with a hydrocarbon phase, which contains the hydrogenated nitrile rubber, the rhodium-containing catalyst residues and a hydrocarbon solvent. It is said that such process is capable of removing rhodium from viscous solutions containing less than 10 ppm rhodium (weight rhodium/weight solution basis). The ion exchange resins used preferably have a relatively large average particle diameter between 0.2 and 2.5 mm.

In U.S. Pat. No. 6,646,059 B2 it is disclosed to remove iron- and rhodium-containing residues from a solution of hydrogenated nitrile rubber which has been obtained by hydrogenating a nitrile rubber in the presence of a rhodium-based catalyst. Iron residues may occur in the solution of the optionally hydrogenated nitrile rubber due to minimum corrosion occuring in the reaction vessels or pipes, especially if the preparation of hydrogenated nitrile rubber is performed using a catalyst containing chloride, like e.g. Wilkinson's catalyst (Cl—Rh[P($C_6H_5$)$_3$]$_3$), and HCl is therefore formed as a bi-product during hydrogenation. Alternatively iron residues may occur due to the fact that iron-containing compounds might have been used as activators in the polymerisation of the nitrile rubber. The process of U.S. Pat. No. 6,646,059 B2 utilizes a specific monodispersed macroporous cross-linked styrene-divinylbenzene copolymer resin having thiourea functional groups. The fact that the ion-exchange resin is monodispersed is important for the successful performance of the process.

In view of the fact that the variety of catalysts which may be used in the preparation of optionally hydrogenated nitrile rubber has steadily increased during the last years, there remains a need for finding new methods for removing metal-containing catalyst residues from optionally hydrogenated nitrile rubber, particularly with respect to viscous solutions of optionally hydrogenated nitrile rubber.

SUMMARY OF THE INVENTION

The present invention relates to a process for the removal of ruthenium-containing catalyst residues from optionally hydrogenated nitrile rubber, this process comprising contacting a solution of an optionally hydrogenated nitrile rubber containing such ruthenium-containing catalyst residues with a functionalized ion-exchange resin which is (i) macroreticular, (ii) modified with at least one type of a functional group which is selected from a primary amine, secondary amine, thiol, carbodithioate, thiourea and dithiocarbamate group and (iii) has an average particle diameter in the range of from 0.2 and 2.5 mm dry basis. The present invention further comprises optionally hydrogenated nitrile rubbers comprising at maximum 20 ppm ruthenium.

DETAILED DESCRIPTION

The process of the present invention starts from a solution of an optionally hydrogenated nitrile rubber which contains ruthenium-containing catalyst residues.

The amount of the ruthenium-containing catalyst residues being present in the solution of the optionally hydrogenated nitrile rubber is from 5 to 1000 ppm of ruthenium, preferably from 5 to 500 ppm, and in particular from 5 to 250 ppm, based on the nitrile rubber used.

The solution of the optionally hydrogenated nitrile rubber which is subjected to the process pursuant to the invention may contain from 0.5 to 30% b.w. of the optionally hydrogenated nitrile rubber, preferably from 2 to 20% b.w., more preferably from 3 to 15 % b.w. and most preferably from 3 to 12% b.w. Hence, such solution is viscous.

The way of obtaining the solution of an optionally hydrogenated nitrile rubber is not critical, as long as it comprises ruthenium-containing catalyst residues. Various methods are known from the relevant prior art.

The optionally hydrogenated nitrile rubber is dissolved in a solvent which is typically an organic solvent, preferably dichloromethane, benzene, monochlorobenzene, toluene, methyl ethyl ketone, acetone, tetrahydrofuran, tetrahydropyran, dioxane and cyclohexane.

Such a solution of an optionally hydrogenated nitrile rubber may be obtained (i) by metathesis of a nitrile rubber in the presence of a ruthenium-containing catalyst and/or (ii) a hydrogenation of the carbon-carbon double bonds present in the nitrile rubber.

In one embodiment of the present invention the solution of the nitrile rubber is obtained by metathesis of a nitrile rubber, in particular in the presence of a ruthenium-containing catalyst.

In another embodiment the solution of the hydrogenated nitrile rubber is obtained by performing (i) the metathesis of the nitrile rubber, in particular in the presence of a ruthenium-containing catalyst and (ii) subsequently a hydrogenation of the carbon-carbon double bonds present in the nitrile rubber, in particular using a rhodium-containing catalyst.

In a third embodiment the solution of the hydrogenated nitrile rubber is obtained by performing a hydrogenation of the carbon-carbon double bonds of a nitrile rubber, in particular in the presence of a ruthenium-containing catalyst.

The term "ruthenium-containing catalyst residues" shall encompass for the purpose of this application any ruthenium-containing catalyst as well as any degradation products thereof, including the ruthenium ion.

Nitrile rubbers ("NBR") are copolymers or terpolymers which comprise repeating units of at least one conjugated diene, at least one α,β-unsaturated nitrite and, optionally one or more further copolymerizable monomers.

The conjugated diene can be of any nature. Preference is given to using ($C_4$-$C_6$) conjugated dienes. Particular preference is given to 1,3-butadiene, isoprene, 2,3-dimethylbutadiene, piperylene or mixtures thereof. Very particular preference is given to 1,3-butadiene and isoprene or mixtures thereof. Especial preference is given to 1,3-butadiene.

As α,β-unsaturated nitrile, it is possible to use any known α,β-unsaturated nitrile, preferably a ($C_3$-$C_5$) α,β-unsaturated nitrile such as acrylonitrile, methacrylonitrile, ethacrylonitrile or mixtures thereof. Particular preference is given to acrylonitrile.

A particularly preferred nitrite rubber is thus a copolymer of acrylonitrile and 1,3-butadiene.

Apart from the conjugated diene and the α,β-unsaturated nitrite, it is possible to use one or more further copolymerizable monomers known to those skilled in the art, e.g. α,β-unsaturated monocarboxylic or dicarboxylic acids, their esters or amides.

As α,β-unsaturated monocarboxylic or dicarboxylic acids, preference is given to fumaric acid, maleic acid, acrylic acid and methacrylic acid.

As esters of α,β-unsaturated carboxylic acids, preference is given to using their alkyl esters and alkoxyalkyl esters. Particularly preferred alkyl esters of α,β-unsaturated carboxylic acids are methyl acrylate, ethyl acrylate, n-butyl acrylate, tert-butyl acrylate, n-butyl methacrylate, tert-butyl methacrylate, 2-ethylhexyl acrylate, 2-ethylhexyl methacrylate and octyl acrylate. Particularly preferred alkoxyalkyl esters of α,β-unsaturated carboxylic acids are methoxyethyl (meth)acrylate, ethoxyethyl (meth)acrylate and methoxyethyl (meth)acrylate. It is also possible to use mixtures of alkyl esters, e.g. those mentioned above, with alkoxyalkyl esters, e.g. in the form of those mentioned above.

The proportions of conjugated diene and α,β-unsaturated nitrile in the NBR polymers to be used can vary within wide ranges. The proportion of or of the sum of the conjugated dienes is usually in the range from 40 to 90% by weight, preferably in the range from 50 to 85% by weight, more preferably from 50 to 82% by weight, and most preferably from 50 to 75% by weight based on the total polymer. The proportion of or of the sum of the α,β-unsaturated nitrites is usually from 10 to 60% by weight, preferably from 15 to 50% by weight, more preferably from 18 to 50% by weight, and most preferably from 25 to 50% by weight, based on the total polymer. The proportions of the monomers in each case add up to 100% by weight. Additional monomers can be present. If this is the case they are present in amounts of from greater than 0 up to 40% by weight, preferably from 0.1 to 40% by weight, particularly preferably from 1 to 30% by weight, based on the total polymer. In this case, corresponding proportions of the conjugated diene(s) and/or of the α,β-unsaturated nitrile(s) are replaced by the proportions of the additional monomers, with the proportions of all monomers in each case adding up to 100% by weight.

The preparation of nitrile rubbers as such by polymerization of the abovementioned monomers is adequately known to those skilled in the art and is comprehensively described in the polymer literature. Typically such nitrile rubbers are prepared by radical emulsion polymerisation. Nitrile rubbers are also commercially available, e.g. as products from the product range of the trade names Perbunan® and Krynac® from Lanxess Deutschland GmbH.

The nitrile rubbers obtained after polymerisation typically have a Mooney viscosity (ML 1+4 at 100° C.) in the range from 5 to 70, preferably from 30 to 50. This corresponds to a weight average molecular weight Mw in the range 50.000-500.000, preferably in the range 200.000-400.000. The nitrile rubbers further have a polydispersity PDI=Mw/Mn, where Mw is the weight average molecular weight and Mn is the number average molecular weight, in the range 1.7-6.0 and preferably in the range 2.0-3.0. The determination of the Mooney viscosity is carried out in accordance with ASTM standard D 1646.

If the nitrile rubber is then subjected to the metathesis reaction, in particular in the presence of a ruthenium-based catalyst the nitrile rubbers obtained typically have a Mooney viscosity (ML 1+4 at 100° C.) in the range of from 2 to 30, preferably in the range of from 5 to 20. This corresponds to a weight average molecular weight Mw in the range of from 10.000-200.000, preferably in the range of from 10.000-150.000. The obtained nitrile rubbers also have a polydispersity PDI=Mw/Mn, where Mn is the number average molecular weight, in the range of from 1.5-4.0, preferably in the range of from 1.7-3.0.

As the metathesis of nitrile rubber is often carried out in an organic solvent, the degraded nitrile rubber is then obtained as a solution in such organic solvent. Typical solvents are those which do not deactivate the metathesis catalyst used and also do not adversely affect the reaction in any other way. Preferred solvents include, but are not restricted to, dichloromethane, benzene, monochlorobenzene, toluene, methyl ethyl ketone, acetone, tetrahydrofuran, tetrahydropyran, dioxane and cyclohexane. Halogenated solvents are preferred, the particularly preferred solvent is monochlorobenzene. However, the metathesis may also be performed in the absence of an organic solvent. In such case the obtained metathesized nitrile rubber is then dissolved afterwards in a suited solvent as e.g. one of the above mentioned ones.

Such metathesis reaction is well-known in the art and e.g. disclosed in WO-A-02/100905 and WO-A-02/100941. A broad overview about the ruthenium-containing catalysts which may be typically used in such metathesis may be found in the not yet published European patent application with the filing number 07114656.

Suitable metathesis catalysts are compounds of the general formula (A)

(A)

wherein
M is ruthenium,
the radicals R are identical or different and are each an alkyl, preferably $C_1$-$C_{30}$-alkyl, cycloalkyl, preferably $C_3$-$C_{20}$-cycloalkyl, alkenyl, preferably $C_2$-$C_{20}$-alkenyl, alkynyl, preferably $C_2$-$C_{20}$-alkynyl, aryl, preferably $C_6$-$C_{24}$-aryl, carboxylate, preferably $C_1$-$C_{20}$-carboxylate, alkoxy, preferably $C_1$-$C_{20}$-alkoxy, alkenyloxy, preferably $C_2$-$C_{20}$-alkenyloxy, alkynyloxy, preferably $C_2$-$C_{20}$-alkynyloxy, aryloxy, preferably $C_6$-$C_{24}$-aryloxy, alkoxycarbonyl, preferably $C_2$-$C_{20}$-alkoxycarbonyl, alkylamino, preferably $C_1$-$C_{30}$-alkylamino, alkylthio, preferably $C_1$-$C_{30}$-alkylthio, arylthio, preferably $C_6$-$C_{24}$-arylthio, alkylsulphonyl, preferably $C_1$-$C_{20}$-alkylsulphonyl, or alkylsulphinyl, preferably $C_1$-$C_{20}$-alkylsulphinyl radical, each of which may optionally be substituted by one or more alkyl, halogen, alkoxy, aryl or heteroaryl radicals, $X^1$ and $X^2$ are identical or different and are two ligands, preferably anionic ligands, and L represents identical or different ligands, preferably uncharged electron donors.

In the catalysts of the general formula (A), $X^1$ and $X^2$ are identical or different and are two ligands, preferably anionic ligands.

$X^1$ and $X^2$ can be, for example, hydrogen, halogen, pseudohalogen, straight-chain or branched $C_1$-$C_{30}$-alkyl, $C_6$-$C_{24}$-aryl, $C_1$-$C_{20}$-alkoxy, $C_6$-$C_{24}$-aryloxy, $C_3$-$C_{20}$-alkyldiketonate, $C_6$-$C_{24}$-aryldiketonate, $C_1$-$C_{20}$-carboxylate, $C_1$-$C_{20}$-alkylsulphonate, $C_6$-$C_{24}$-arylsulphonate, $C_1$-$C_{20}$-alkylthiol, $C_6$-$C_{24}$-arylthiol, $C_1$-$C_{20}$-alkylsulphonyl or $C_1$-$C_{20}$-alkylsulphinyl radicals. The abovementioned radicals $X^1$ and $X^2$ can also be substituted by one or more further radicals, for example by halogen, preferably fluorine, $C_1$-$C_{10}$-alkyl, $C_1$-$C_{10}$-alkoxy or $C_6$-$C_{24}$-aryl, where these radicals may also in turn be substituted by one or more substituents selected from the group consisting of halogen, preferably fluorine, $C_1$-$C_5$-alkyl, $C_1$-$C_5$-alkoxy and phenyl. In a preferred embodiment, $X^1$ and $X^2$ are identical or different and are each halogen, in particular fluorine, chlorine, bromine or iodine, benzoate, $C_1$-$C_5$-carboxylate, $C_1$-$C_5$-alkyl, phenoxy, $C_1$-$C_5$-alkoxy, $C_1$-$C_5$-alkylthio, $C_6$-$C_{24}$-arylthio, $C_6$-$C_{24}$-aryl or $C_1$-$C_5$-alkylsulphonate. In a particularly preferred embodiment, $X^1$ and $X^2$ are identical and are each halogen, in particular chlorine, $CF_3COO$, $CH_3COO$, $CFH_2COO$, $(CH_3)_3CO$, $(CF_3)_2(CH_3)CO$, $(CF_3)(CH_3)_2CO$, PhO (phenoxy), MeO (methoxy), EtO (ethoxy), tosylate (p-$CH_3$—$C_6H_4$—$SO_3$), mesylate (2,4,6-trimethylphenyl) or $CF_3SO_3$ (trifluoromethanesulphonate).

In the general formula (A), L represents identical or different ligands, preferably uncharged electron donors.

The two ligands L can, for example, each be, independently of one another, a phosphine, sulphonated phosphine, phosphate, phosphinite, phosphonite, arsine, stibine, ether, amine, amide, sulphoxide, carboxyl, nitrosyl, pyridine, thioether or imidazolidine ("Im") ligand. Preference is given to the two ligands L each being, independently of one another, a $C_6$-$C_{24}$-arylphosphine, $C_1$-$C_5$-alkylphosphine or $C_3$-$C_{20}$-cycloalkylphosphine ligand, a sulphonated $C_6$-$C_{24}$-arylphosphine or $C_1$-$C_{10}$-alkylphosphine ligand, a $C_6$-$C_{24}$-aryl phosphinite or $C_1$-$C_{10}$-alkyl phosphinite ligand, a $C_6$-$C_{24}$-aryl phosphonite or $C_1$-$C_{10}$-alkyl phosphonite ligand, a $C_6$-$C_{24}$-aryl phosphite or $C_1$-$C_{10}$-alkylphosphite ligand, a $C_6$-$C_{24}$-arylarsine or $C_1$-$C_{10}$-alkylarsine ligand, a $C_6$-$C_{24}$-arylamine or $C_1$-$C_{10}$-alkylamine ligand, a pyridine ligand, a $C_6$-$C_{24}$-aryl sulphoxide or $C_1$-$C_{10}$-alkyl sulphoxide ligand, a $C_6$-$C_{24}$-aryl ether or $C_1$-$C_{10}$-alkyl ether ligand or a $C_6$-$C_{24}$-arylamide or $C_1$-$C_{10}$-alkylamide ligand, each of which may be substituted by a phenyl group which may in turn be substituted by a halogen, $C_1$-$C_5$ alkyl radical or $C_1$-$C_5$-alkoxy radical.

The meaning of the term "phosphine" for the ligands L includes, for example, $PPh_3$, P(p-Tol)$_3$, P(o-Tol)$_3$, $PPh(CH_3)_2$, $P(CF_3)_3$, P(p-$FC_6H_4$)$_3$, P(p-$CF_3C_6H_4$)$_3$, P($C_6H_4$—$SO_3Na$)$_3$, P($CH_2C_6H_4$—$SO_3Na$)$_3$, P(iso-Pr)$_3$, P(CHCH$_3$(CH$_2$CH$_3$))$_3$, P(cyclopentyl)$_3$, P(cyclohexyl)$_3$, P(neopentyl)$_3$ and P(neophenyl)$_3$.

Phosphinite includes, for example, triphenyl phosphinite, tricyclohexyl phosphinite, triisopropyl phosphinite and methyl diphenylphosphinite.

Phosphite includes, for example, triphenyl phosphite, tricyclohexyl phosphite, tri-tert-butyl phosphite, triisopropyl phosphite and methyl diphenyl phosphate.

Stibine includes, for example, triphenylstibine, tricyclohexylstibine and trimethylstibene.

Sulphonate includes, for example, trifluoromethanesulphonate, tosylate and mesylate.

Sulphoxide includes, for example, $CH_3S(=O)CH_3$ and $(C_6H_5)_2SO$.

Thioether includes, for example, $CH_3SCH_3$, $C_6H_5SCH_3$, $CH_3OCH_2CH_2SCH_3$ and tetrahydrothiophene.

The imidazolidine radical (Im) usually has a structure of the general formula (Ia) or (Ib),

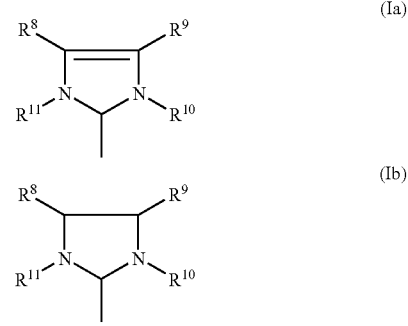

where $R^8$, $R^9$, $R^{10}$, $R^{11}$ are identical or different and are each hydrogen, straight-chain or branched $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{20}$-aryloxy, $C_2$-$C_{20}$-alkoxycarbonyl, $C_1$-$C_{20}$-alkylthio, $C_6$-$C_{20}$-arylthio, $C_1$-$C_{20}$-alkylsulphonyl, $C_1$-$C_{20}$-alkylsulphonate, $C_6$-$C_{20}$-arylsulphonate or $C_1$-$C_{20}$-alkylsulphinyl.

If desired, one or more of the radicals $R^8$, $R^9$, $R^{10}$, $R^{11}$ can, independently of one another, be substituted by one or more substituents, preferably straight-chain or branched $C_1$-$C_{10}$-alkyl, $C_3$-$C_8$-cycloalkyl, $C_1$-$C_{10}$-alkoxy or $C_6$-$C_{24}$-aryl, with these abovementioned substituents in turn being able to be substituted by one or more radicals, preferably selected from the group consisting of halogen, in particular chlorine or bromine, $C_1$-$C_5$-alkyl, $C_1$-$C_5$-alkoxy and phenyl.

In particular catalysts of the general formula (A) may be used in which $R^8$ and $R^9$ are each, independently of one another, hydrogen, $C_6$-$C_{24}$-aryl, particularly preferably phenyl, straight-chain or branched $C_1$-$C_{10}$-alkyl, particularly preferably propyl or butyl, or together form, with inclusion of the carbon atoms to which they are bound, a cycloalkyl or aryl radical, where all the abovementioned radicals may in turn be substituted by one or more further radicals selected from the group consisting of straight-chain or branched $C_1$-$C_{10}$-alkyl, $C_1$-$C_{10}$-alkoxy, $C_6$-$C_{24}$-aryl and functional groups selected from the group consisting of hydroxy, thiol, thioether, ketone, aldehyde, ester, ether, amine, imine, amide, nitro, carboxyl, disulphide, carbonate, isocyanate, carbodiimide, carboalkoxy, carbamate and halogen.

In one embodiment catalysts of the general formula (A) are used in which the radicals $R^{10}$ and $R^{11}$ are identical or different and are each straight-chain or branched $C_1$-$C_{10}$-alkyl, particularly preferably i-propyl or neopentyl, $C_3$-$C_{10}$-cycloalkyl, preferably adamantyl, $C_6$-$C_{24}$-aryl, particularly preferably phenyl, $C_1$-$C_{10}$-alkylsulphonate, particularly preferably methanesulphonate, $C_6$-$C_{10}$-arylsulphonate, particularly preferably p-toluenesulphonate. Radicals $R^{10}$ and $R^{11}$ of the abovementioned type may optionally be substituted by one or more further radicals selected from the group consisting of straight-chain or branched $C_1$-$C_5$-alkyl, in particular methyl, $C_1$-$C_5$-alkoxy, aryl and functional groups selected from the group consisting of hydroxy, thiol, thioether, ketone, aldehyde, ester, ether, amine, imine, amide, nitro, carboxyl, disulphide, carbonate, isocyanate, carbodiimide, carboalkoxy, carbamate and halogen. In particular, the radicals $R^{10}$ and $R^{11}$ may be identical or different and are each i-propyl, neopentyl, adamantyl or mesityl.

Only for the sake of clarity it is hereby confirmed that the structures as depicted in the general formulae (Ia) and (Ib) of this application with regard to the structure of the imidazolidine ("Im")-radical shall have the same meaning as the structures often shown and used in the relevant literature with regard to such imidazolidine radicals which are hereinafter depicted as structures (Ia') und (Ib') and which emphasize the carben-like structure of the imidazolidine radical.

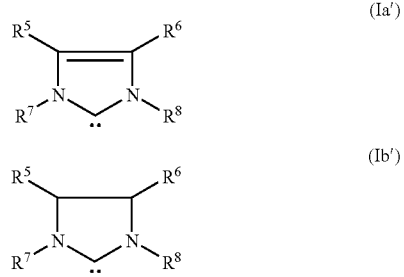

A variety of representatives of the catalysts of the formula (A) are known in principle, e.g. from WO-A-96/04289 and WO-A-97/06185.

Particular preference is given to both ligands L in the general formula (A) being identical or different trialkylphosphine ligands in which at least one of the alkyl groups is a secondary alkyl group or a cycloalkyl group, preferably isopropyl, isobutyl, sec-butyl, neopentyl, cyclopentyl or cyclohexyl.

Particular preference is given to one ligand L in the general formula (A) being a trialkylphosphine ligand in which at least one of the alkyl groups is a secondary alkyl group or a cycloalkyl group, preferably isopropyl, isobutyl, sec-butyl, neopentyl, cyclopentyl or cyclohexyl.

Two catalysts which are preferred and come under the general formula (A) have the structures (II) (Grubbs (I) catalyst) and (III) (Grubbs (II) catalyst), where Cy is cyclohexyl.

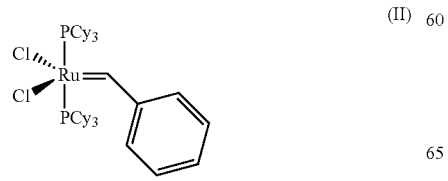

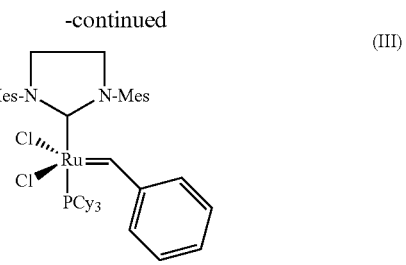

The metathesis may also be performed using catalysts of the general formula (B),

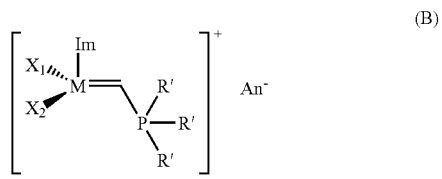

where
M is ruthenium,
$X^1$ and $X^2$ can be identical or different and are anionic ligands,
the radicals R' are identical or different and are organic radicals,
Im is a substituted or unsubstituted imidazolidine radical and
An is an anion.

These catalysts are known in principle (see for example, Angew. Chem. Int. Ed. 2004, 43, 6161-6165).

$X^1$ and $X^2$ in the general formula (B) can have the same general, preferred and particularly preferred meanings as in the formula (A).

The imidazolidine radical (Im) usually has a structure of the general formula (Ia) or (Ib) which have already been mentioned for the catalyst type of the formulae (A).

The radicals R' in the general formula (B) are identical or different and are each a straight-chain or branched $C_1$-$C_{30}$-alkyl, $C_5$-$C_{30}$-cylcoalkyl or aryl radical, with the $C_1$-$C_{30}$-alkyl radicals optionally being able to be interrupted by one or more double or triple bonds or one or more heteroatoms, preferably oxygen or nitrogen.

Aryl encompasses an aromatic radical having from 6 to 24 skeletal carbon atoms. As preferred monocyclic, bicyclic or tricyclic carbocyclic aromatic radicals having from 6 to 10 skeletal carbon atoms, mention may be made by way of example of phenyl, biphenyl, naphthyl, phenanthrenyl or anthracenyl.

The radicals R' in the general formula (B) are preferably identical and are each phenyl, cyclohexyl, cyclopentyl, isopropyl, o-tolyl, o-xylyl or mesityl.

Further suitable catalysts to be used in metathesis are those of the general formula (C),

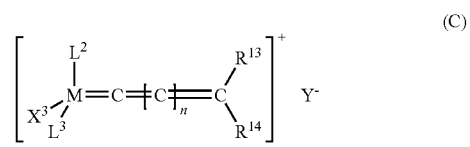

where

M is ruthenium, $R^{13}$ and $R^{14}$ are each, independently of one another, hydrogen, $C_1$-$C_{20}$-alkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylthio, $C_1$-$C_{20}$-alkylsulphonyl or $C_1$-$C_{20}$-alkylsulphinyl, $X^3$ is an anionic ligand, $L^2$ is an uncharged π-bonded ligand, regardless of whether it is monocyclic or polycyclic, $L^3$ is a ligand from the group of phosphines, sulphonated phosphines, fluorinated phosphines, functionalized phosphines having up to three aminoalkyl, ammonioalkyl, alkoxyalkyl, alkoxycarbonylalkyl, hydrocarbonylalkyl, hydroxyalkyl or ketoalkyl groups, phosphites, phosphinites, phosphonites, phosphine amines, arsines, stibines, ethers, amines, amides, imines, sulphoxides, thioethers and pyridines, $Y^{31}$ is a noncoordinating anion and n is 0, 1, 2, 3, 4 or 5.

Further suitable catalysts for performing the metathesis are those of the general formula (D),

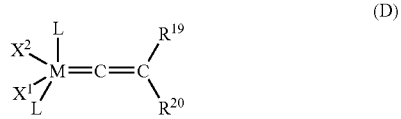

(D)

where

M is ruthenium, $X^1$ and $X^2$ are identical or different and are anionic ligands which can assume all the meanings of $X^1$ and $X^2$ in the general formulae (A) and (B), L are identical or different ligands which can assume all the general and preferred meanings of L in the general formulae (A) and (B), $R^{19}$ and $R^{20}$ are identical or different and are each hydrogen or substituted or unsubstituted alkyl.

Further suitable catalysts for performing the metathesis are those of the general formula (E), (F) and (G).

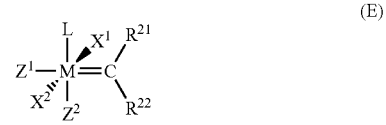

(E)

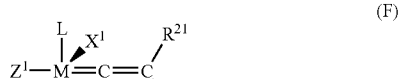

(F)

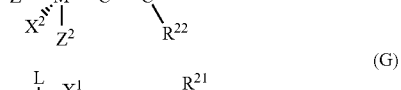

(G)

where

M is ruthenium, $X^1$ and $X^2$ are identical or different ligands, preferably anionic ligands, $Z^1$ and $Z^2$ are identical or different and neutral electron donor ligands, $R^3$ and $R^4$ are identical or different and hydrogen or a substituent selected from the group consisting of alkyl, cycloalkyl, alkenyl, alkynyl, aryl, carboxylate, alkoxy, alkenyloxy, alkynyloxy, aryloxy, alkoxycarbonyl, alkylamino, dialkylamino, alkylthio, arylthio, alkylsulphonyl and alkylsulphinyl radical, each of which may optionally be substituted by one or more substituents, preferably alkyl, halogen, alkoxy, aryl or heteroaryl radicals, and L is a ligand As the prior art also discloses other metal based metathesis catalysts wherein the metal is not ruthenium, but e.g. osmium, it is hereby stated for the sake of clarity that the metathesis of the nitrile rubber may also be performed in the presence of such other catalysts, if the metathesized nitrile rubber is subsequently subjected to a hydrogenation in the presence of a ruthenium-based hydrogenation catalyst.

It is possible to directly subject such solution of metathesized nitrile rubber to the process pursuant to the invention.

However, in a further embodiment of the present invention it is also possible to use a solution of a hydrogenated nitrile rubber which has been obtained by a hydrogenation reaction to which the nitrile rubbers are subjected beforehand. In a preferred embodiment of the present invention the hydrogenation of the nitrile rubber is performed after a metathesis has been performed in the first step. During such hydrogenation at least 50 mole %, preferably at least 80 mole %, more preferably from 85-99.9 mole % and most preferably from 90 to 99.5 mole % of the original carbon-carbon double bonds present in the nitrile rubber are hydrogenated.

Such hydrogenation may be carried out using a broad variety of different catalysts based on different metals like e.g. rhodium-containing complex catalysts or ruthenium-containing complex catalysts. In one preferred embodiment rhodium-containing catalysts are used for such hydrogenation, if the nitrile rubber has been subjected to a metathesis in the presence of a ruthenium-containing catalyst beforehand. However, the hydrogenation is not limited to using a rhodium-containing catalyst. The use of rhodium-containing complexes as catalysts for the hydrogenation of nitrile rubber is described in GB-A-1,558,491.

The hydrogenation of nitrile rubber is typically carried out in an organic solvent, and the hydrogenated nitrile rubber is then present in such solvent. Typical solvents are those which do not deactivate the hydrogenation catalyst used and also do not adversely affect the reaction in any other way. Preferred solvents include but are not restricted to dichloromethane, benzene, monochlorobenzene, toluene, methyl ethyl ketone, acetone, tetrahydrofuran, tetrahydropyran, dioxane and cyclohexane. Halogenated solvents are preferred, the particularly preferred solvent is monochlorobenzene. However, the hydrogenation may also be performed in the absence of an organic solvent in bulk. In such case the obtained hydrogenated nitrile rubber is then dissolved afterwards in a suited solvent as e.g. one of the above mentioned ones.

Ion Exchange Resin:

The process of the present invention uses an ion-exchange resin which is (i) macroreticular, (ii) modified with at least one type of functional group selected from a primary amine, secondary amine, thiol, carbodithioate, thiourea and dithiocarbamate group and has (iii) an average particle diameter in the range of from 0.2 to 2.5 mm.

Such ion-exchange resin is capable of removing ruthenium-containing catalyst residues from the optionally hydrogenated nitrile rubber.

The term "macroreticular" is meant to have its conventional meaning in ion-exchange terminology: Macroreticular ion exchange resins are made of two continuous phases, a continuous pore phase and a continuous gel polymeric phase and they have permanent pores which can be measured by nitrogen BET. Macroreticular ion exchange resins typically display surface areas ranging from 7 to 1500 m$^2$/g, and average pore diameters ranging from 50 to 1.000.000 Å. Typical macroreticular resins often have an average pore volume in excess of 0.7 ml/gram. Such resins typically comprise cross-linked copolymers, especially styrene-divinylbenzene copolymers.

It is necessary for the ion-exchange resin to be macroreticular, but this condition (i) is not itself sufficient, conditions (ii) and (iii) must simultaneously be met. Suitable ion exchange resins are therefore additionally characterized by a functionalization with at least one type of functional group which is selected from a primary amine, secondary amine, thiol, carbodithioate, thiourea and dithiocarbamate group.

Typically the said ion-exchange resins are characterized by a concentration of functional groups in the range of from 0.2 to 7.0 mol/L, preferably in the range of from 0.5 to 5.0 mol/L, more preferably in the range of from 0.7 to 3.0 mol/L and most preferably in the range of from 1.0 to 2.0 mol/L.

The ion-exchange resins must additionally have an average particle diameter in the range of from 0.2 to 2.5 mm dry basis, preferably in the range of from 0.25 and 0.8 mm dry basis. Such average particle diameter can either be measured by BET analysis with an inert gas like nitrogen or argon or by mercury intrusion, both methods being standard methods in chemical industry.

Applicable ion exchange resins are either commercially available or may be prepared according to procedures known to an artisan or described in literature, e.g. U.S. Pat. Nos. 4,985,540, 5,118,716, 6,646,059.

The process according to the present invention may be performed either batch-wise (discontinuous) or in a continuous manner.

In a typical discontinuous embodiment of the invention the ion exchange resin is added to the solution of the optionally hydrogenated nitrile rubber comprising ruthenium-containing catalyst residues and the mixture is stirred for a period of time sufficient for the ruthenium-containing catalyst residues to be removed by the resin. The reaction time can vary from 5 to 100 hours, and is preferably in the range of from 48 to 72 hours. The resin is removed by simple filtration and the rubber recovered by removal of the solvent using standard techniques known in the art, such as evaporation under reduced pressure.

The reaction may be carried out in an inert atmosphere, for example under a blanket of nitrogen.

Preferably, the amount of resin used in the discontinuous practice of the invention ranges from 0.1 to 10% by weight, based upon the amount of optionally hydrogenated nitrile rubber in the solution. More preferably, from 0.5 to 5% by weight of resin are used based on the optionally hydrogenated nitrile rubber used.

Suitable operating temperatures of the discontinuous process range from 60° C. to 150° C. Preferably, the operating temperature is in the range of from 90° C. to 120° C. Temperatures higher than 160° C. should in general not be used because of the potential for decomposition of the ion-exchange resin.

In a further aspect of the invention the process is performed continuously. In such case the process for the removal of ruthenium-containing catalyst residues from optionally hydrogenated nitrile rubber is performed in a column which results in a markedly lower pressure drop across the system, thus increasing production capacity by allowing a higher volume throughput.

In such embodiment the ion-exchange resin is assembled in a bed configuration, for example by packing the resin in a column (i.e. a cylindrical container), and the solution of the optionally hydrogenated nitrile rubber solution is run through the column in a continuous manner.

During such continuous operation suitable operating temperatures also typically also in the range of from 60° C. to 150° C. Preferably, the operating temperature is in the range of from 90° C. to 120° C. Temperatures higher than 160° C. should in general not be used because of the potential for decomposition of the ion-exchange resin.

With regard to the continuous operation the concentration of the optionally hydrogenated nitrile rubber in the solution lies in the range of from 0.5 to 30% b.w., preferably from 2 to 20% b.w., more preferably from 3 to 15% b.w. and most preferably from 3 to 12% b.w.

The viable amount of resin to be used for the continuous operation may be adjusted by any person skilled in the art.

In another embodiment of the invention the rubber solution may be passed through the column more than once, thus ensuring that as much of the catalyst residue as possible is removed by the resin.

As will be appreciated by those skilled in the art, a substantial pressure drop is caused by the flow of a solution through a bed of small particles. This phenomenon is particularly pronounced when the solution is viscous and the particles are very fine and of varying particle size. In a preferred embodiment of the present invention, however, the pressure drop resulting from the flow of the ruthenium-containing hydrogenated nitrile rubber solution through the ion-exchange resin bed is between 0.5 to 30 pounds per square inch gauge (psig) per foot of bed depth, and the total pressure drop is from 10 psig to 180 psig.

The optionally hydrogenated nitrile rubber may be isolated from the solution after the process pursuant to the invention by methods generally known in the art to recover a polymer from a polymer solution. Examples thereof are a steam coagulation method wherein a polymer solution is brought into direct contact with steam, a drum drying method wherein a polymer solution is dropped onto a heated rotating drum to evaporate the solvent, and a method wherein a poor solvent is added to a polymer solution to precipitate the polymer. The polymer is recovered as a solid product by separating said polymer from the solution through such separation means, removing water and drying the resulting polymer by a procedure such as hot-air drying, vacuum drying or extrusion drying. Preferably the optionally hydrogenated nitrile rubber is isolated by using the steam coagulation.

The optionally hydrogenated nitrile rubber obtainable by the process pursuant to this invention is distinguished by a very low content of the ruthenium-containing catalyst residues.

The present invention therefore also relates to a novel optionally hydrogenated nitrile rubber comprising at maximum 20 ppm ruthenium, preferably at maximum 10 ppm ruthenium, more preferably at maximum 5 ppm ruthenium and most preferably at maximum 3 ppm ruthenium, based on the optionally hydrogenated nitrile rubber. Such novel optional hydrogenated nitrile rubber is excellently suited for all applications in which even traces of metals have a detrimental influence and which therefore require a high purity rubber.

Further details of the invention are provided by the following non-limiting examples.

EXAMPLES

The following materials are used:

Lewatit® OC 1601 (LANXESS Deutschland GmbH; Leverkusen, Germany) (this being a thiourea-functionalized macroporous resin)

Lewatit® MonoPlus MP 500 (LANXESS Deutschland GmbH, Leverkusen, Germany) (this being an amine-functionalized macroporous resin)

A hydrogenated nitrile rubber containing 34% b.w. acrylonitrile, with less than 0.9% residual double bonds, and a Mooney viscosity (ML 1+4@100° C.) of about 40, which has been prepared by subjecting a nitrile butadiene rubber (34% b.w. acrylonitrile, 66% b.w. butadiene) to a metathesis reaction in the presence of Grubbs (II) catalyst (see formula (III) above) followed by a hydrogenation in the presence of RhCl(PPh$_3$)$_3$ (Ph=phenyl) as catalyst.

A 6.0% (by weight) solution of such hydrogenated nitrile rubber in monochlorobenzene was used as the standard, and the term "standard nitrile rubber solution", as used herein, refers to this solution.

Examples 1A (Inventive) and 1B (Comparative) Batchwise

In the inventive Example 1A 0.5 g of Lewatit® OC 1601 was added together with 180 g of the standard rubber solution to a 500 ml three-necked round bottom flask. The reaction mixture was stirred at ca. 100° C. under nitrogen for 66 hours. The resin was then removed from the mixture by filtration and the rubber was recovered by evaporation of the solvent in a rotary evaporator, followed by drying in a oven at 60° C. under reduced pressure. Samples of the recovered rubber were analyzed for Ru content by inductively coupled plasma (ICP-AES: Inductively coupled plasma—atomic emission spectroscopy). The results are shown in Table 1.

In the Comparative Example 1B, the rubber from an untreated, 180 g sample of the standard nitrile rubber solution was recovered by the evaporation/drying procedures described above. The amount of Ru in this "control sample" was also measured by ICP-AES.

In contrast to the control sample, the Ru content of the rubber recovered after treatment with the ion exchange resin was found to be 10 ppm, while the control sample had 15 ppm. This result indicates that 33% of the Ru was removed.

TABLE 1

| Sample | ion exchange resin (g) | Initial Ru content (ppm) | Ru content after inventive process (ppm) | Ru Removal (%) |
|---|---|---|---|---|
| Comparative Example 1 B | — | 15 | — | — |
| Example 1 A | 0.5 | 15 | 10 | 33 |

Example 2A (Inventive) and 2B (Comparative) Batchwise

In the inventive Example 2A 0.5 g of Lewatit® MonoPlus MP 500 was added together with 180 g of the standard nitrile rubber solution to a 500 ml three-necked round bottom flask. Each reaction mixture was stirred at ca. 100° C. under nitrogen for 66 hours. The resin was then removed from the mixture by filtration and the rubber was recovered by evaporation of the solvent in a rotary evaporator, followed by drying in a reduced pressure oven at 60° C. Samples of the recovered rubber were analyzed for Ru by inductively coupled plasma. The results are shown in Table 2.

In the Comparative Example 2B, the rubber from an untreated, 180 g sample of the standard rubber solution was recovered by the evaporation/drying procedures described above. The amount of Ru in this "control sample" was measured by ICP-AES and all subsequent results are quoted with respect to the initial amounts present.

In contrast to the control sample, the Ru content of the rubber recovered after treatment was found to be 10 ppm: This result indicates that 33% of the Ru was removed (i.e. in comparison to the Ru content in the standard rubber sample).

TABLE 2

| Sample | ion exchange resin (g) | Initial Ru content (ppm) | Ru content after inventive process (ppm) | Ru Removal (%) |
|---|---|---|---|---|
| Comparative Example 2 B | — | 15 | — | — |
| Example 2 A | 0.5 | 15 | 10 | 33 |

What is claimed is:

1. A process for the removal of ruthenium-containing catalyst residues from optionally hydrogenated nitrile rubber comprising the treatment of a solution of an optionally hydrogenated nitrile rubber containing ruthenium-containing catalyst residues with a functionalized ion exchange resin, characterized in that such functionalized ion exchange resin is (i) macroreticular, (ii) modified with at least one type of functional group which is selected from a primary amine, secondary amine, thiol, carbodithioate, thiourea and a dithiocarbamate group and (iii) has an average particle diameter in the range of from 0.2 to 2.5 mm dry basis and wherein the resin comprises styrene-divinylbenzene copolymers.

2. The process according to claim 1, wherein the solution of the optionally hydrogenated nitrile rubber to be contacted with the functionalized ion exchange resin comprises from 5 to 1000 ppm of ruthenium, based on the optionally hydrogenated nitrile rubber.

3. The process according to claim 1 wherein the solution of the optionally hydrogenated nitrile rubber to be contacted with the functionalized ion exchange resin comprises from 5 to 500 ppm of ruthenium, based on the optionally hydrogenated nitrile rubber.

4. The process according to claim 1 or 2, wherein the solution of the optionally hydrogenated nitrile rubber to be contacted with the functionalized ion exchange resin comprises from 0.5 to 30% by weight of the optionally hydrogenated nitrile rubber.

5. The process according to claim 1 or 2, wherein the solution of the optionally hydrogenated nitrile rubber to be contacted with the functionalized ion exchange resin comprises from 2 to 20% by weight of the optionally hydrogenated nitrile rubber.

6. The process according to claim 1 or 2, wherein the solution of the optionally hydrogenated nitrile rubber to be contacted with the functionalized ion exchange resin comprises from 3 to 12% by weight of the optionally hydrogenated nitrile rubber.

7. A process according to claim 1 or 2, wherein a solution of the optionally hydrogenated nitrile rubber in dichloromethane, benzene, monochlorobenzene, toluene, methyl ethyl ketone, acetone, tetrahydrofuran, tetrahydropyran, dioxane or cyclohexane is used.

8. The process according to claim 1 or 2, wherein the solution of the optionally hydrogenated nitrile rubber containing ruthenium-containing catalyst residues is obtained (i) by metathesis of a nitrile rubber in the presence of a ruthenium based catalyst and optionally (ii) a subsequent hydrogenation of the carbon-carbon double bonds present in the nitrile rubber.

9. The process according to claim 1 or 2, wherein the solution of a hydrogenated nitrile rubber containing ruthenium-containing catalyst residues is obtained by a hydrogenation of the carbon-carbon double bonds present in the nitrile rubber in the presence of a ruthenium-containing catalyst.

10. The process according to claim 1 or 2, wherein a solution of an optionally hydrogenated nitrile rubber is used which represents an optionally hydrogenated copolymer comprising repeating units of at least one conjugated diene and at least one a,β-unsaturated nitrile.

11. The process according to claim 1 or 2, wherein a solution of an optionally hydrogenated nitrile rubber is used which represents an optionally hydrogenated copolymer comprising repeating units of at least one conjugated diene, at least one α,β-unsaturated nitrile and, optionally one or more further copolymerizable monomers.

12. The process according to claim 1 or 2, wherein a hydrogenated nitrile rubber is used in which at least 50 mole% of the original carbon-carbon double bonds present in the nitrile rubber have been hydrogenated.

13. The process according to claim 1 or 2, wherein a hydrogenated nitrile rubber is used in which at least 80 mole% of the original carbon-carbon double bonds present in the nitrile rubber have been hydrogenated.

14. The process according to claim 1 or 2, wherein the functionalized ion-exchange resins are characterized by a concentration of functional groups in the range of from 0.2 to 7.0 mol/L.

15. The process according to claim 1 or 2, wherein the functionalized ion-exchange resins are characterized by a concentration of functional groups in the range of from 0.5 to 5.0 mol/L.

16. The process according to claim 1 or 2, wherein the functionalized ion-exchange resins are characterized by an average particles diameter in the range of from 0.5 and 0.8 mm dry basis.

17. The process according to claim 1 or 2, wherein it is performed batch-wise (discontinuously) or continuously.

18. The process according to claim 1 or 2, wherein the operating temperature lies in the range from 60° C. to 150° C.

19. The process according to claim 1 or 2, wherein the ion-exchange resin is packed into a column and the solution of the optionally-hydrogenated nitrile rubber comprising the ruthenium-containing catalyst residues is passed through the column in a continuous manner.

20. An optionally hydrogenated nitrile rubber comprising at maximum 20 ppm ruthenium based on the optionally hydrogenated nitrile rubber, wherein the optionally hydrogenated nitrile rubber is obtained (i) by metathesis of a nitrile rubber in the presence of a ruthenium based catalyst and optionally (ii) a subsequent hydrogenation of the carbon-carbon double bonds present in the nitrile rubber.

21. An optionally hydrogenated nitrile rubber comprising at maximum 10 ppm ruthenium based on the optionally hydrogenated nitrile rubber, wherein the optionally hydrogenated nitrile rubber is obtained (i) by metathesis of a nitrile rubber in the presence of a ruthenium based catalyst and optionally (ii) a subsequent hydrogenation of the carbon-carbon double bonds present in the nitrile rubber.

22. An optionally hydrogenated nitrile rubber comprising at maximum 5 ppm ruthenium based on the optionally hydrogenated nitrile rubber, wherein the optionally hydrogenated nitrile rubber is obtained (i) by metathesis of a nitrile rubber in the presence of a ruthenium based catalyst and optionally (ii) a subsequent hydrogenation of the carbon-carbon double bonds present in the nitrile rubber.

23. An optionally hydrogenated nitrile rubber comprising at maximum 3 ppm ruthenium based on the optionally hydrogenated nitrile rubber, wherein the optionally hydrogenated nitrile rubber is obtained (i) by metathesis of a nitrile rubber in the presence of a ruthenium based catalyst and optionally (ii) a subsequent hydrogenation of the carbon-carbon double bonds present in the nitrile rubber.

* * * * *